United States Patent [19]

Olander

[11] 4,231,323

[45] Nov. 4, 1980

[54] MILKING MACHINE CLAW

[75] Inventor: Karl E. Olander, Sodertalje, Sweden

[73] Assignee: Alfa-Laval AB, Tumba, Sweden

[21] Appl. No.: 41,102

[22] Filed: May 21, 1979

[30] Foreign Application Priority Data

May 26, 1978 [SE] Sweden .............................. 7806050

[51] Int. Cl.³ .......................... A01J 5/00; A01J 7/00
[52] U.S. Cl. .............................. 119/14.08; 119/14.55
[58] Field of Search .............. 119/14.55, 14.54, 14.37, 119/14.08; 137/DIG.8, 510

[56]     References Cited
        U.S. PATENT DOCUMENTS 2,896,573   7/1959   Schalm et al. ................ 119/14.55 X
3,125,067   3/1964   Fosnes ........................ 119/14.55
3,150,637   9/1964   Fosnes ........................ 119/14.54

*Primary Examiner*—Hugh R. Chamblee
*Attorney, Agent, or Firm*—Cyrus S. Hapgood

[57]              ABSTRACT

An outlet from the claw housing is controlled by a valve which allows a small discharge flow even in its closed position. The valve is operated by a pneumatic member comprising two flexible diaphragms defining between them a working chamber, the diaphragms having unequal areas and being exposed outside the working chamber to the pressure in the milk manifold of the claw. Thus, the valve operating member is actuated by changes in the difference between the pressures in the manifold and the working chamber.

5 Claims, 4 Drawing Figures

MILKING MACHINE CLAW

The present invention relates to a milking machine claw of the type comprising a housing with a milk manifold connected to the teat cups of the milking machine and provided with at least one outlet for air and/or milk, a valve for controlling the outlet, and a pneumatic operating member for operating the valve.

In machine milking, it is desirable that air be prevented from entering the outlet line of the milk claw in case the teat cup cluster should fall off the cow's udder during milking. To this end, claws have been used which are provided with a valve actuatable by the increase of pressure to atuomatically close the outlet when the pressure exceeds a certain level due to atmospheric air entering the claw.

A known milk claw of this kind is provided with a valve connected through a stem to a control means provided on the outside of the claw. At the beginning of the milking, the valve is adjusted manually to an open position and is then held in this position by the vacuum in the claw. If the vacuum is neutralized by large amounts of air flowing into the claw, the valve means falls down by gravity and closes the outlet. A claw of this kind is disclosed in U.S. Pat. No. 3,014,455.

The valve used in this known claw (which has a connection stem extending through the wall of the claw to the outer control means) has proved to be unsuitable from a hygienic point of view. The valve must also be adjusted manually at the beginning of the milking operation.

An object of the present invention is to eliminate the above drawbacks and to provide a milk claw which is more hygienic and operates fully automatically without any manual actuation. Another object is to provide a milk claw which can be remote-controlled by means of vacuum for facilitating automatic removal of the milking means after milking. This has been obtained by means of a milk claw of the above-mentioned type which, according to the invention, is generally characterized in that the valve comprises a valve member cooperating with a valve seat in the housing, a leak opening being provided in the sealing surface between said valve member and said seat, said leak opening allowing a small flow through the valve in the closed position thereof, there being an operating member which includes two flexible diaphragms having mutually differing areas, both said diaphragms being exposed to the pressure in the milk manifold, a working chamber being defined between said membranes, said operating member being activated in relation to a pressure difference between said manifold and said working chamber.

The invention will be described more in detail below with reference to the accompanying drawings, in which FIG. 1 is a vertical sectional view of a first embodiment of the milk claw according to the invention, with the valve in a closed position, taken along the line I—I in FIG. 2;

Figure 1:
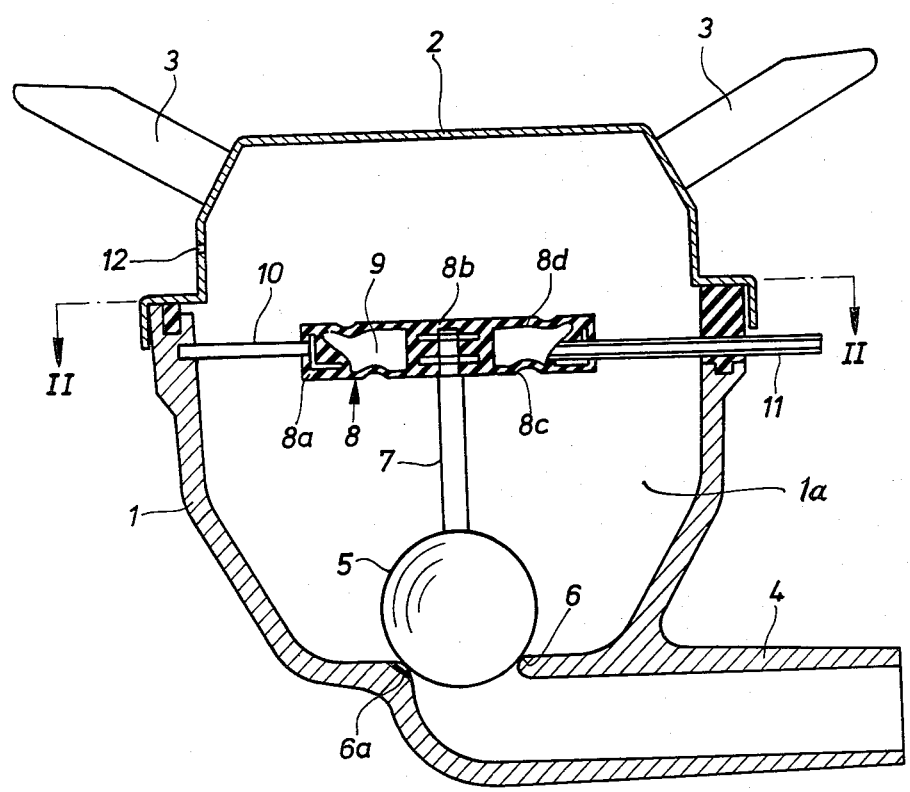
Figure 2:
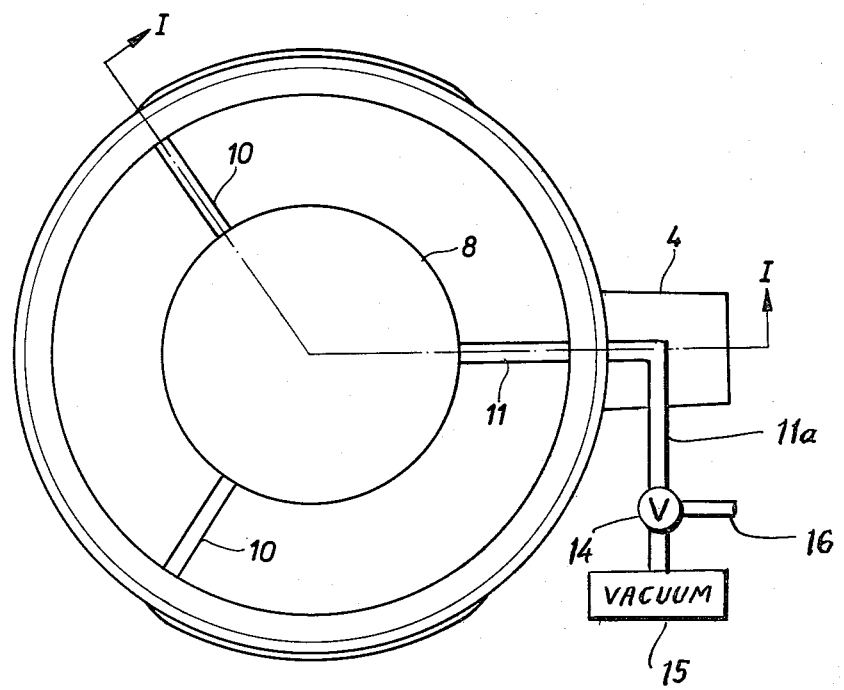
FIG. 2 is a horizontal sectional view along the line II—II in FIG. 1.
Figure 3:
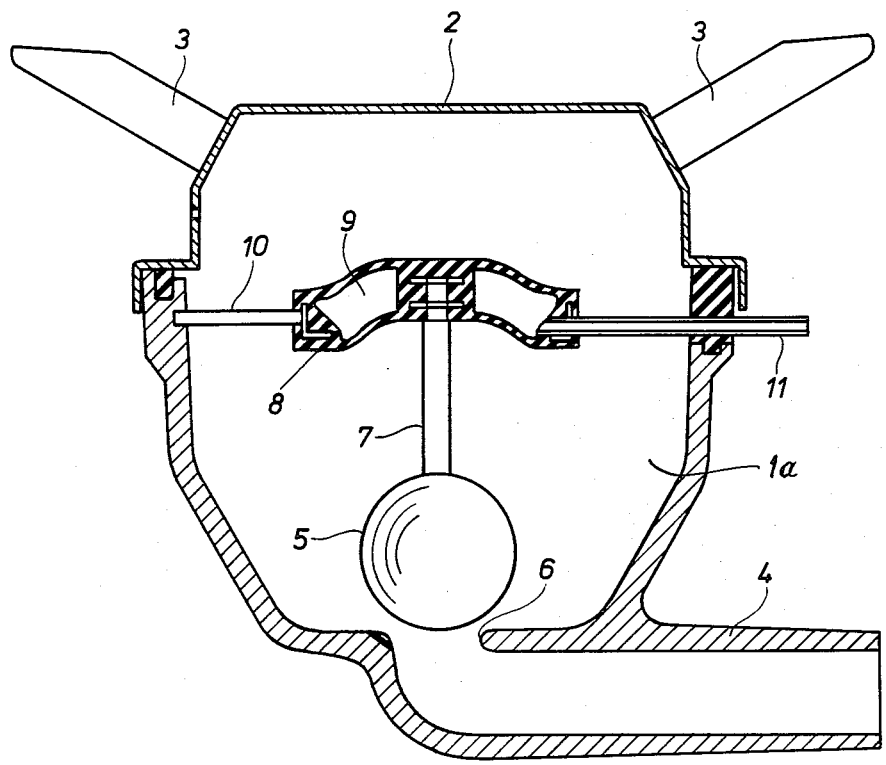
FIG. 3 is a view corresponding to FIG. 1 with the valve in an open position.

The milk claw shown in FIGS. 1-3 comprises a housing 1 provided with a cover 2, the latter having inlet tubes 3 each of which is connected to a teat cup (not shown). At its lower portion, the housing 1 has an outlet tube 4 for connection to a milk line (not shown). The outlet is controlled by a spherical valve member 5 cooperating with a valve seat 6 in the housing. The valve seat is provided with a groove 6a which allows a small flow even in the closed position of the valve, as shown in FIG. 1.

The valve member 5 is mechanically connected by means of a stem 7 to a pneumatic operating member 8 comprising a stationary, annular outer portion 8a, a central, movable portion 8b to which the stem 7 is connected, and two flexible diaphragms 8c and 8d which interconnect portions 8a and 8b and enclose between them an annular working chamber 9. The outer portion 8a is connected to the housing 1 by means of spokes 10 and 11. The spoke 11 extends through the wall of the housing and forms a tube through which the working chamber 9 is connected to the atmosphere. The cover 2 is provided with a small opening 12 which allows a small flow of air into the claw.

The valve is in the position shown in FIG. 1 when atmospheric pressure prevails in the milk collecting manifold 1a of the claw as well as in the working chamer 9 of the operating member 8. When the milking operation is to be started, the outlet 4 is connected to a vacuum source causing the pressure in the manifold 1a to drop, while on the other hand the pressure in the chamber 9 remains unchanged. Since the area of the lower diaphragm 8c is smaller than that of the upper diaphragm 8d, the resulting overpressure in chamber 9, as compared with the interior of the claw, actuates the operating member 8 and thus the valve member 5 to take the position shown in FIG. 3. In this position, the valve is open, which is the normal position during milking.

If the teat cups should fall of the cow's udder, air will flow into the milk claw via the inlet tubes 3, whereby the vacuum is neutralized. Consequently, the valve immediately returns to the closed position shown in FIG. 1. The atmospheric air is thereby prevented from flowing out through the outlet 4. Thus, the valve is opened and closed fully automatically in relation to the pressure difference between the interior of the claw and the working chamber 9.

The above-described valve assembly can also be remote-controlled, and in such case the tube 11 is preferably connected by means of a hose (not shown) to a control gear for controlling automatic removal of the milking means in relation to the milk flow. Such equipment is well known to anyone skilled in the art and therefore will not be described in more detail here. At the end of the milking, when the milk flow has been reduced to a predetermined value, the working chamber 9 is connected to vacuum via tube 11, whereby the pressure difference between chamber 9 and the interior of the claw is neutralized and the valve is adjusted to its closed position. The removal of the teat cup cluster, which preferably takes place with a certain time delay after the closing of the valve, is hereby facilitated.

As shown in FIG. 2, tube 11 has an extension 11a leading to a vlave 14 which is operable to connect working chamber 9 to either a vacuum source 15 or a duct 16 open to atmosphere.

Figure 4:
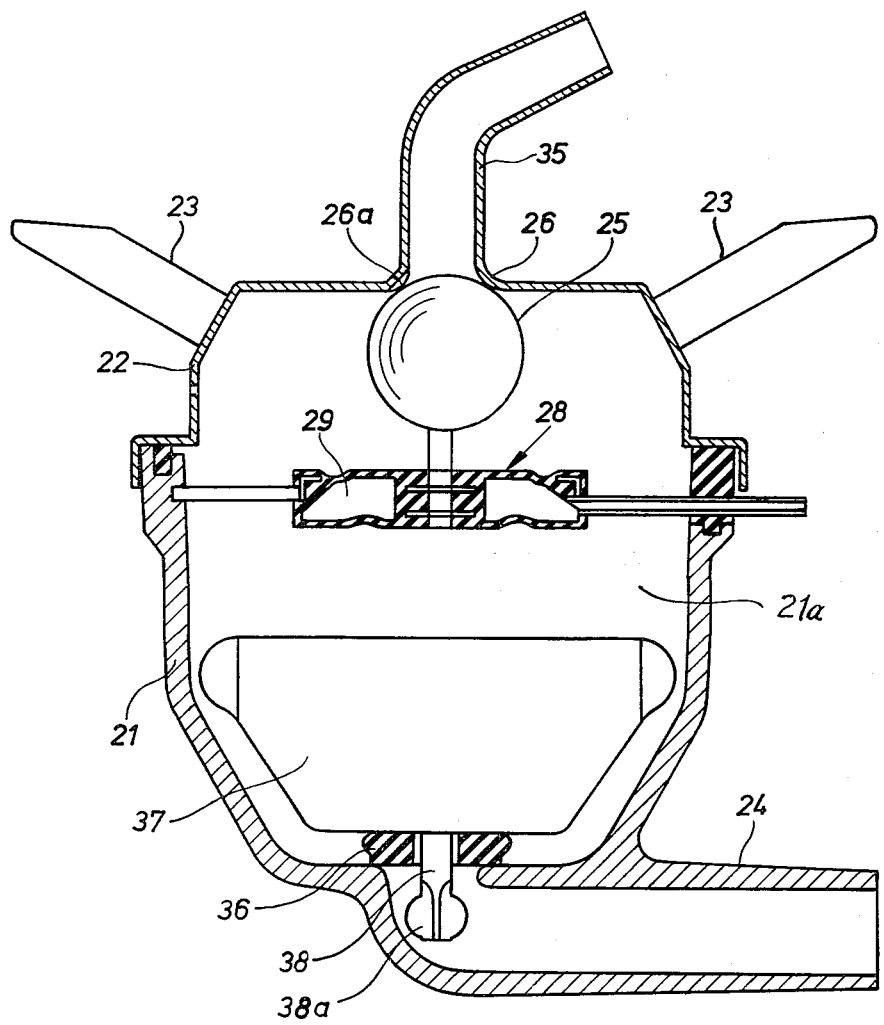
FIG. 4 is a vertical sectional view of a second embodiment of the milk claw according to the invention.

The embodiment of the milk claw illustrated in FIG. 4 comprises a housing 21 having a cover 22 provided with inlets 23. At its top portion, it is provided with an air outlet 35 which is to be connected to a vacuum source (not shown) and is controlled by a valve member 25 and an operating member 28, both the lastmentioned members being generally identical with corresponding members in FIGS. 1-3. The valve member 25 cooperates with a seat 26 provided with a groove 26a. The valve operates in the same way as has been described above and thus automatically opens and closes the air outlet 35 in relation to the pressure difference between the working chamber 29 and the interior of the claw. The valve can also be remote-controlled in the manner described above in order to facilitate automatic removal of the teat cup cluster.

The lower portion of the milk claw is provided with a milk outlet 24 which is to be connected to a milk line. The milk outlet is controlled by an annular valve member 36 which is controlled by a float 37. The latter is provided with a pin 38 which extends downwards through the valve member and has radial protrusions 38a at its lower end.

When the milk flow is small, the float 37 is raised only a small distance, the valve member 36 remaining in its lower position and the milk flowing out through the annular gap between the valve member and the pin 38. When the flow of milk is more plentiful and cannot be accommodated by this gap, the milk level rises so that the float is moved further upwards. The protrusions 38a then engage the valve member and lift it upwards, whereby the outlet is uncovered. When the flow of milk ceases, the float and the valve member return to the closed position shown in FIG. 4, whereby air is prevented from flowing out through the milk outlet 24.

I claim:

1. In a milk claw for milking machines, the combination of a housing forming a milk manifold and adapted for connecting said manifold to the teat cups of a milking machine, the housing having an outlet from said manifold, a valve for controlling said outlet and including a valve seat in the housing and a valve member coacting with said seat to open and close the valve, there being a leak opening which allows a small flow through said valve in the closed position thereof, and a pneumatic operating member structurally supported in the housing and connected to the valve for operating the same, said operating member comprising two flexible diaphragms which define between the diaphragms a working chamber separated from the milk manifold, one of said diaphragms having a larger area than the other diaphragm, both of said diaphragms being exposed outside said working chamber to the pressure in the milk manifold, whereby said operating member is actuated by variations in the difference between the pressures in said manifold and said working chamber.

2. The combination of claim 1, in which said outlet is a milk outlet.

3. The combination of claim 1, in which said outlet is an air outlet.

4. The combination of claim 1, in which said working chamber is connected to atmosphere.

5. The combination of claim 1, comprising also a vacuum source, and means for selectively connecting the working chamber to either said vacuum source or atmosphere.

* * * * *